United States Patent
White et al.

(10) Patent No.: US 9,956,905 B2
(45) Date of Patent: May 1, 2018

(54) VEHICLE MOUNTED LASER PROJECTOR

(71) Applicant: SMIDSY LTD., London (GB)

(72) Inventors: Matthew White, Bexhill-on-Sea (GB); Emily Brooke, Clifton (GB)

(73) Assignee: SMIDSY, LTD., London (GB)

(*) Notice: Subject to any disclaimer, the term of this patent is extended or adjusted under 35 U.S.C. 154(b) by 0 days. days.

(21) Appl. No.: 14/791,359

(22) Filed: Jul. 3, 2015

(65) Prior Publication Data

US 2016/0031366 A1  Feb. 4, 2016

(30) Foreign Application Priority Data

Jul. 3, 2014 (GB) .................................. 1411928.3

(51) Int. Cl.
| | |
|---|---|
| *B60Q 1/50* | (2006.01) |
| *G02B 27/42* | (2006.01) |
| *H04N 9/31* | (2006.01) |
| *B60Q 1/26* | (2006.01) |
| *G03B 21/20* | (2006.01) |
| *B60Q 1/00* | (2006.01) |

(52) U.S. Cl.
CPC ........... *B60Q 1/503* (2013.01); *B60Q 1/0035* (2013.01); *B60Q 1/2661* (2013.01); *G02B 27/4205* (2013.01); *H04N 9/3194* (2013.01); *B60Q 1/0023* (2013.01); *B60Q 1/50* (2013.01); *B60Q 2400/50* (2013.01); *G03B 21/2033* (2013.01)

(58) Field of Classification Search
CPC ............... G03B 21/006; G03B 21/145; G03B 21/2013; G03B 21/2033; G03B 21/2053; B60Q 1/0023; B60Q 1/0076; B60Q 1/503
See application file for complete search history.

(56) References Cited

U.S. PATENT DOCUMENTS

| | | | | |
|---|---|---|---|---|
| 6,324,203 B1* | 11/2001 | Owa | ................... | G03F 7/70025 372/106 |
| 9,366,946 B2* | 6/2016 | Kurashige | .............. | G02B 27/48 |
| 2004/0114379 A1* | 6/2004 | Miller | .................... | B60Q 1/085 362/464 |
| 2005/0117131 A1* | 6/2005 | Khazova | .............. | G02B 27/025 353/120 |
| 2006/0023172 A1* | 2/2006 | Ikeda | ................. | G02B 27/0961 353/94 |
| 2006/0082560 A1* | 4/2006 | Greer | ................... | H04N 9/3108 345/204 |
| 2007/0084496 A1 | 4/2007 | Edey et al. | | |
| 2009/0010016 A1 | 1/2009 | Lee et al. | | |

(Continued)

FOREIGN PATENT DOCUMENTS

| | | |
|---|---|---|
| GB | 2474486 B | 4/2011 |
| WO | 2014080168 A1 | 5/2014 |

OTHER PUBLICATIONS

International Search Report (PCT/ISA/210) corresponding to Application No. PCT/GB2013/052394, dated Feb. 19, 2014, citations listed above.

*Primary Examiner* — Sultan Chowdhury
(74) *Attorney, Agent, or Firm* — Loeb & Loeb LLP

(57) ABSTRACT

This invention relates to a method of projecting laser light onto a road surface from a vehicle. It also relates to an apparatus for projecting laser light onto a road surface from a vehicle. Said apparatus may be a stand-alone device mounted on a vehicle, or it may be integrally formed with a vehicle.

7 Claims, 4 Drawing Sheets

(56) References Cited

U.S. PATENT DOCUMENTS

| | | |
|---|---|---|
| 2009/0161031 A1* | 6/2009 | Kaise ................ G02F 1/133553 |
| | | 349/5 |
| 2009/0187078 A1 | 7/2009 | Dunlop et al. |
| 2009/0201589 A1* | 8/2009 | Freeman ............ G02B 27/0103 |
| | | 359/630 |
| 2010/0283590 A1* | 11/2010 | Tee ........................ A42B 3/044 |
| | | 340/432 |
| 2010/0302515 A1* | 12/2010 | Plut ...................... H04N 9/3155 |
| | | 353/85 |
| 2011/0067465 A1 | 3/2011 | Luo et al. |
| 2012/0086183 A1 | 4/2012 | Ken et al. |
| 2012/0112635 A1 | 5/2012 | Cho et al. |
| 2012/0285026 A1 | 11/2012 | Min |
| 2015/0274231 A1 | 10/2015 | White et al. |
| 2017/0080991 A1 | 3/2017 | White et al. |
| 2017/0137080 A1 | 5/2017 | White et al. |

* cited by examiner

VEHICLE MOUNTED LASER PROJECTOR

CROSS-REFERENCE TO RELATED APPLICATIONS

This application claims the benefit of priority of GB 1411928.3 filed Jul. 3, 2014, the entire disclosure of which is incorporated herein by reference.

BACKGROUND OF THE INVENTION

Vehicles often have integrally formed front and rear lights, which serve the dual purpose of illuminating the way ahead for the vehicle operator, and for alerting pedestrians or other road users to the presence of the vehicle. These lights are particularly important at night, when the vision of both the vehicle operator and pedestrians or other road users may be diminished.

Vehicle owners may also fit supplementary lights to their vehicle if they intend to operate the vehicle in conditions with particularly poor visibility (e.g. in inclement weather such as fog or snow). Such supplementary lights are well known in the art, and usually comprise high-powered LEDs or halogen lamps.

Vehicle lights, integral or supplementary, are often only used at night. In daylight they are unnecessary for illuminating the way for the driver and, for conventional cars at least, unnecessary and ineffective at alerting pedestrians and other road users to the presence of the vehicle. For electric cars this second point is problematic. As electric cars are far quieter than conventional combustion-engine cars, pedestrians and other road users cannot rely on sound to be alerted to the presence of a vehicle. Additionally, conventional integral and supplementary lights are not powerful enough to perform an alerting function in daylight.

It is also sometimes desirable to convey information about a vehicle to either pedestrians, onlookers, or other road users who are external to the vehicle.

It is an aim of the present invention to provide a vehicle light capable of alerting pedestrians and other road users to the presence of a vehicle during daylight, and capable of conveying information about a vehicle to those external to the vehicle.

To overcome the drawbacks associated with prior art vehicle lights, the present invention provides a vehicle light comprising a laser projector which can project vehicle information onto a surface external to the vehicle which may be viewed by a person outside the vehicle.

SUMMARY OF THE INVENTION

In accordance with a first aspect of the present invention there is provided a laser projector comprising:
a power source;
a laser light source;
a diffractive optical element; and
vehicle attachment means,
wherein, in use, the laser projector is attached to a vehicle via the vehicle attachment means, and the laser light source produces a beam of laser light which passes through the diffractive optical element to produce an image on a surface external to the vehicle.

In accordance with a second aspect of the present invention there is provided a vehicle comprising an integral laser projector, said laser projector comprising:
a power source;
a laser light source; and
a diffractive optical element,
wherein, in use, the laser light source produces a beam of laser light which passes through the diffractive optical element to produce an image on a surface external to the vehicle.

In accordance with a third aspect of the present invention there is provided a method of projecting a laser light image onto a road surface from a vehicle comprising the steps of:
providing a power source;
providing a laser light source; and
providing a diffractive optical element,
wherein said laser light source produces a beam of laser light which passes through the diffractive optical element to produce an image on a surface external to the vehicle.

BRIEF DESCRIPTION OF THE DRAWINGS

FIG. 2a schematically shows a laser projector in accordance with another embodiment of the invention, with FIGS. 2b-f showing stages of an operating scheme of the laser projector of FIG. 2a.

FIG. 3a schematically shows a laser projector in accordance with another embodiment of the invention, with FIG. 3b showing an operating scheme of the laser projector of FIG. 3a.

DETAILED DESCRIPTION OF THE INVENTION

Figure 1:
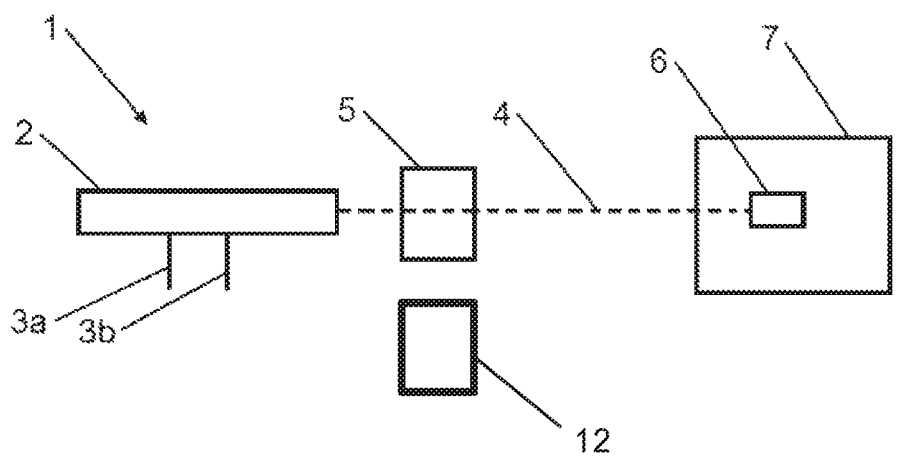
FIG. 1 schematically shows a laser projector in accordance with an embodiment of the invention.

In the embodiment where the laser projector is a stand-alone device, it may be mounted to any internal or external surface of the vehicle provided it has, from its mounted position, a line of sight to a surface external to the vehicle onto which it may project a laser light image. Said line of sight may either be a direct line of sight, or it may involve reflecting the laser light beam produced by the laser light source off one or more mirror, or refracting the beam through one or more refractive element (e.g. a prism). The laser light beam may pass through a window of the vehicle, such as a side window, a windshield or rear window.

Examples of mounting places for the laser projector include, for example, a ceiling of the vehicle, a roof of the vehicle, an internal or external surface of a door of the vehicle, a bonnet of the vehicle, a boot of the vehicle, a spoiler of the vehicle or a bumper of the vehicle.

In the embodiment where the laser projector is integrally formed with the vehicle, the projector could be integrally formed with, for example, a ceiling of the vehicle, a roof of the vehicle, an internal or external surface of a door of the vehicle, a bonnet of the vehicle, a boot of the vehicle, a spoiler of the vehicle or a bumper of the vehicle. The laser projector could also be incorporated into the headlight cluster of the vehicle.

In a particular embodiment for Formula One, or Formula E, racing cars, the laser projector may be mounted on or around the engine intake above the driver's head (a camera mount is often placed here). The laser projector may alternatively be formed integrally formed with the engine intake, or with a camera mount on the engine intake.

Suitable surfaces on which to project a laser light image include, for example, a road surface on which the vehicle is driving, a footpath or pavement adjacent to the road surface, a vertical wall (e.g. of a building) near to the vehicle, the ceiling of a tunnel through which the vehicle is passing, a side or underside of a bridge under which the vehicle is passing, the external surface of another vehicle, or an external surface of the vehicle itself.

The laser light image projected by the laser projector may include information about the vehicle. For example, speed, acceleration, bearing/direction, weight, vehicle make and/or model, estimated stopping distance, etc. If the vehicle is participating in a race (e.g. a Formula One or Formula E race) the laser light image may convey details such as driver identity, team, position in the race, etc.

The laser projector may operate under a projection regime. For example, a useful regime for pit-lane safety when the vehicle is participating in a Formula One or Formula E race could be:

i) no information is projected when the vehicle is stopped;
ii) information is projected at low speed; and
iii) no information is projected above a threshold speed (e.g. the pit-lane speed limit).

The operation of the laser could be managed by control circuitry within the laser projector itself, or by the vehicle's on-board electronics. The value for speed could be derived from the vehicle's speedometer, or a separate speedometer within the laser projector. Other projection regimes could be customised to suit the use of the specific vehicle. For example, the laser projector or the vehicle may comprise means for sensing the amount of ambient light. This information may be fed to control circuitry within the laser projector itself, or the vehicle's on-board electronics, which may adjust the power of the laser light source to compensate, i.e. such that the laser light image is always visible regardless of ambient light conditions. As another example, the laser projector or the vehicle may include proximity- or distance-sensing means. The laser projector could be configured to switch off the laser light source if the proximity- or distance-sensing means senses that an object is too close to the vehicle, or blocking the target surface for the laser light image. As a further example, the laser projector or the vehicle would have sensing means for sensing the amount of reflected laser light. The laser projector could be configured to switch off the laser light source if this sensing means detected that a large amount of laser light (e.g. about a threshold amount) was being reflected back towards the laser projector or the vehicle.

The laser projector could comprise an array of laser light sources each having its own diffractive optical element to produce an image composed of pixels, each laser/diffractive optical element combination corresponding to one pixel of the image. For example, an array of 2 rows and 10 columns, could produce a 20 pixel image. The pixels could be illuminated in various orders to convey different pieces of information, e.g. sweeping sequentially left-to-right to indicate imminent turning, all flashing to indicate a sudden stop, etc. As a further example, an array of 10 rows and 20 columns could produce a 200 pixel image. Rapid switching of the laser and diffractive optical elements could produce a crude video projection. This crude video projection could be used to display static or moving text, animations, photographs, or low-quality real-time video.

The laser light sources could comprise "eye-safe" laser light sources, i.e. light sources of sufficiently low power that they will not damage the human eye if the diffractive optical element fails or is damaged. Such eye-safe sources include lasers in the 1 mW to 5 mW range. Lasers in this power range generally do not cause permanent damage to the human eye because the blink reflex will shut the eyelid before power sufficient to cause damage is transmitted to the eye.

However, in some embodiments, the laser projector will comprise only one high-powered laser and one diffractive optical element.

The diffractive optical element(s) may comprise a static element suitable for projecting a single image, or a liquid crystal capable of changing the projected image dynamically. To improve the projected image, it may be desirable to skew the image produced by the diffractive optical element, such that the image appears unskewed when projected onto a surface. The more oblique the angle between the laser light beam and the target surface, the more skewed the image produced by the diffractive optical element will need to be to appear unskewed when viewed on the target surface.

Embodiments of the invention will now be described with reference to the accompanying drawings.

FIG. 1 schematically shows a laser projector 1 in accordance with an embodiment of the invention. The laser projector 1 comprises a laser light source 2 and a diffractive optical element (DOE) 5. The laser light source 2 has an internal power source in the form of a battery (not shown). Said battery may be charged through a charging port on the laser light source, or connected to a power source of a vehicle (e.g. through a cigarette lighter of a vehicle). The laser projector 1 also comprises a vehicle attachment means in the form of brackets 3a, 3b. The laser projector may be attached to a vehicle using the brackets 3a, 3b in use. In some embodiments, the laser projector 1 or the vehicle may comprise a means for sensing an amount of ambient light 12.

The laser light source 1 is operable to produce a beam of laser light 4. As shown in FIG. 1, the beam of laser light 4 passes through the DOE 5 to produce an image 6 on a surface 7. In use, the laser projector 1 is attached to a vehicle, and the surface 7 is external to the vehicle. That is, the surface 7 may be a surface outside of the vehicle, or an outer surface of the vehicle itself.

Figures 2A, 2B, 2C, 2D, 2E, 2F:
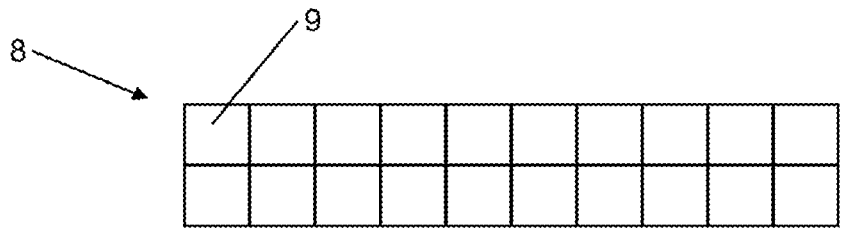

FIG. 2a schematically shows a laser projector 8 in accordance with another embodiment of the invention. In FIG. 2a, the laser projector 8 comprises an array of laser light sources and a plurality of diffractive optical elements (DOEs) 9, each DOE 9 being associated with a respective laser light source. The view of FIG. 2a is end-on, and so only the DOEs 9 are visible, the laser light sources being located behind the DOEs 9. The array of FIG. 2a comprises two rows of ten columns.

FIGS. 2b-f show successive stages of an operating scheme of the laser projector of FIG. 2a. Only the laser light sources associated with the DOEs marked with an X are activated. As can be seen from FIGS. 2b-f the laser light sources are switched on and off sequentially to give the impression that a block of light is sweeping from the extreme left of the array to the extreme right. This operating scheme may be appropriate to indicate that the vehicle to which the laser projector 8 is attached is about to make a turn.

Figure 3A:
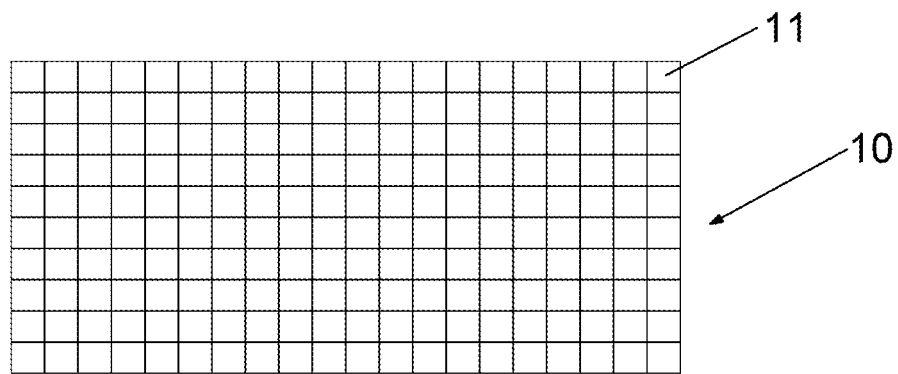

FIG. 3a schematically shows a laser projector 10 in accordance with another embodiment of the invention. In FIG. 3a, the laser projector 10 comprises an array of laser light sources and a plurality of diffractive optical elements (DOEs) 11, each DOE 11 being associated with a respective laser light source. The view of FIG. 3a is end-on, and so only the DOEs 11 are visible, the laser light sources being located behind the DOEs 11. The array of FIG. 3a comprises ten rows of twenty columns.

Figure 3B:
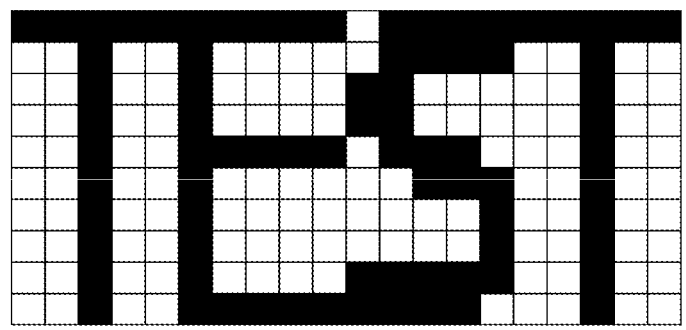

FIG. 3b shows an operating scheme of the laser projector of FIG. 3a. Only the laser light sources associated with the DOEs which are blacked out are activated. As can be seen from FIG. 3b, the laser light sources have been switched on in a special arrangement to produce an image composed of pixels. In the example of FIG. 3b, said image is a piece of text, i.e. the word 'TEST', although clearly any piece of text could be displayed in practice. The text in FIG. 3b is static, although the laser projector could be configured to display scrolling text using a similar technique to that shown in FIG. 2b-f.

Figure 4:
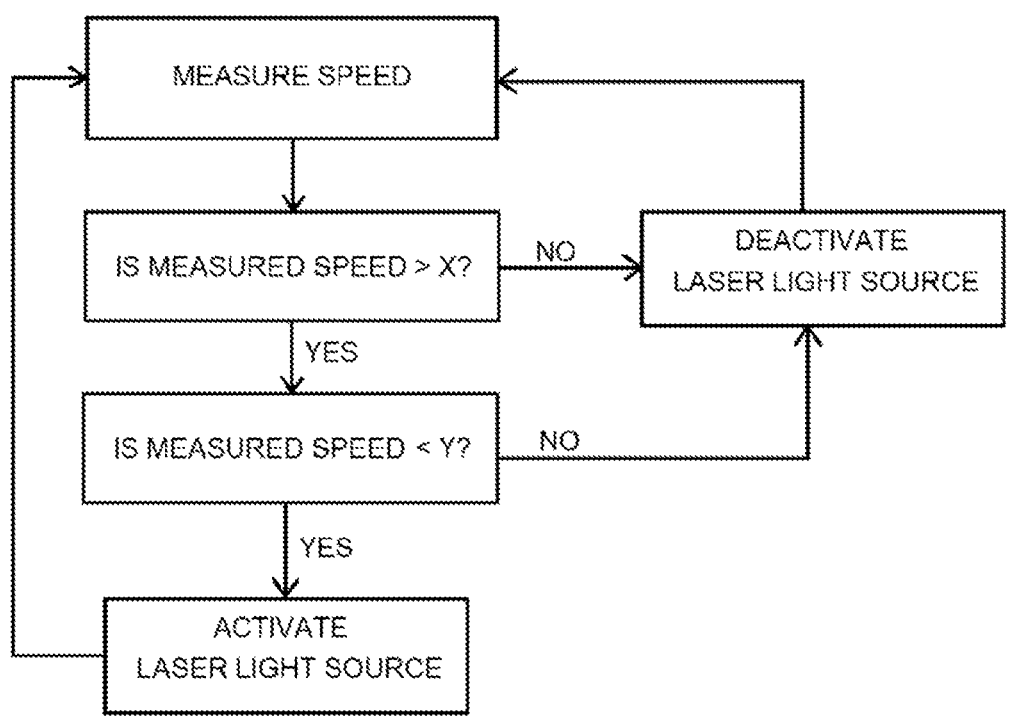
FIG. 4 shows a block diagram of a projection regime suitable for use with a laser projector according to the invention.

FIG. 4 shows a block diagram of a projection regime suitable for use with a laser projector according to the invention. In order to operate using the projection regime of FIG. 4, the laser projector must either comprise its own on-board speedometer, or be connected to a speedometer of a vehicle.

The regime starts at the box marked 'MEASURE SPEED'. In this step, a reading from the speedometer (internal or otherwise) is taken.

The regime then moves to the next box as shown by the arrow to 'IS MEASURED SPEED>X?'. This is a comparison step which may be performed by control circuitry associated with the laser projector. The value of X is the threshold value for the lower end of the speed range in which it is desired for the laser projector to produce an image. This value may be programmed during assembly of the laser projector and 'hard coded', or it may be a variable that can be selected by the end user of the laser projector.

If the measured speed is less than X, the regime moves on to the next box as indicated by the arrow marked 'NO'. In this case, the laser light source is deactivated, and the regime moves back to the initial step of measuring the speed.

If the measured speed is greater than X, the regime moves on to the next box as indicated by the arrow marked 'YES' to 'IS MEASURED SPEED<Y?'. This is a comparison step which may be performed by control circuitry associated with the laser projector. The value of Y is the threshold value for the upper end of the speed range in which it is desired for the laser projector to produce an image. Again, this value may be programmed during assembly of the laser projector and 'hard coded', or it may be a variable that can be selected by the end user of the laser projector.

If the measured speed is not less than Y, the regime moves on to the next box as indicated by the arrow marked 'NO'. In this case, the laser light source is deactivated, and the regime moves back to the initial step of measuring the speed.

If the measured speed is less than Y, the regime moves on to the next box as indicated by the arrow marked 'YES'. In this case, the laser light source is activated, an image is produced, and the regime moves back to the initial step of measuring the speed.

The invention is not limited to the specific embodiments disclosed above, and other possibilities will be apparent to those skilled in the art.

What is claimed is:

1. A laser projector comprising:
a power source;
means for sensing an amount of ambient light;
a laser light source;
a diffractive optical element; and
a vehicle attachment means,
wherein, in use, the laser projector is attached to a vehicle via the vehicle attachment means, and the laser light source produces a beam of laser light which passes through the diffractive optical element to produce an image on a surface external to the vehicle, and wherein the laser projector is configured to switch off the laser light source if the sensed amount of ambient light exceeds a threshold amount.

2. The laser projector according to claim 1 comprising an array of laser light sources and a plurality of diffractive optical elements, each diffractive optical element being associated with a respective laser light source,
wherein the laser projector is configured to switch off the array of laser light sources if the sensed amount of ambient light exceeds a threshold amount.

3. The laser projector according to claim 2, wherein the array of laser light sources comprises 2 rows and 10 columns of laser light sources.

4. The laser projector according to claim 2, wherein the array of laser light sources comprises 10 rows and 20 columns of laser light sources.

5. The laser projector according to any of claims 2 to 4, wherein the array of laser light sources produces an image composed of pixels.

6. The laser projector according to any of claims 2 to 4, wherein the laser light sources and diffractive optical elements of the array of laser light sources and diffractive optical elements are switched rapidly to produce a video projection.

7. The laser projector according to any of claims 2 to 4, wherein the laser light sources and diffractive optical elements of the array of laser light sources and diffractive optical elements are switched sequentially.

* * * * *